United States Patent [19]
Ben-Meir et al.

[11] Patent Number: 5,652,893
[45] Date of Patent: Jul. 29, 1997

[54] SWITCHING HUB INTELLIGENT POWER MANAGEMENT

[75] Inventors: Sam Ben-Meir, Sharon; John F. Gibbons, Natick; Ian Thomas, Hopkinton, all of Mass.

[73] Assignee: 3COM Corporation, Santa Clara, Calif.

[21] Appl. No.: 355,056

[22] Filed: Dec. 13, 1994

[51] Int. Cl.[6] .................................................. G06F 1/32
[52] U.S. Cl. ...................................................... 395/750
[58] Field of Search .................................... 364/492, 493; 395/750

[56] References Cited

U.S. PATENT DOCUMENTS

| | | | |
|---|---|---|---|
| 4,591,983 | 5/1986 | Bennett et al. | 364/403 |
| 4,677,566 | 6/1987 | Whittaker et al. | 364/492 |

*Primary Examiner*—Jack B. Harvey
*Assistant Examiner*—David A. Wiley
*Attorney, Agent, or Firm*—McGlew & Tuttle

[57] ABSTRACT

A power management system rod for local area network hubs includes a network switching hub with a connection backplane with a plurality of connection slots. A power supply is provided having one or more elements providing a maximum power available for the system. Manageable modules are connected to said switching hub, each of said manageable modules having a memory providing information as to the power requirements of the module. A controller module is connected to said manageable modules via said switching hub. The controller module includes memory means for receiving data from said manageable modules as to power requirements. A microprocessor is provided for calculating power requirements of the system and for controlling the supply of power to each of said modules.

21 Claims, 4 Drawing Sheets

SWITCHING HUB INTELLIGENT POWER MANAGEMENT

FIELD OF THE INVENTION

The present invention relates to switching hubs or concentrators for use in local area networks. The invention is specifically directed to an automated, real-time system for managing power in local area network concentrators or switching hubs.

BACKGROUND OF THE INVENTION

Local area network concentrators also commonly referred to as hubs, intelligent hubs, or switching hubs have come into wide use, to support networks ranging from one that connects a relatively small number of users, servers, devices, etc. to one that connects thousands of users, servers and devices spread over different geographic areas to form an enterprise network. Local area network concentrators allow the network manager to install media modulus that support different protocols (e.g., ethernet, token ring, FDDI) and different media (e.g., fiber optics, twisted pair) to satisfy the networking needs. Local area network concentrators also allow management of the local area network connections and provide information as to status of the network. Because networks are an increasingly critical part of a company's infra-structure, key feature of such a switching hub is the need to keep the hub operational and to keep the local area network up and running, even if various components of the network fail or various components of the hub fail.

A network manager continually contends with increasing demands on the network, due to the increasing number of applications and users of the network. To satisfy these growing demands, the network manager must be able to scale the network by hot installing more media modules to support more users or new modules supporting higher bandwidth into the hub while it is operational. To meet the power needs of newly installed modules in the hub, the network manager must also be able to scale the hub's power capacity by hot installing additional power supply elements into the hub while it is operational. Since the switching hub may already be supporting numerous network users potentially performing mission critical applications, the network manager can not afford to shutdown the hub and the network it carries. The alternative is hot installation of hub upgrades (modules or power supply elements) with the resultant risk of power overload and hub shutdown. This invention prevents this scenario from occurring.

Networking technology also continues to evolve. Modules continue to be developed that will operate within the switching hub that support higher speed protocols, internetworking, and more advanced features, all in an attempt to satisfy the ever increasing network bandwidth demands. Hence, to accommodate future modules operating in the hub, this invention provides a generic, automated means of managing power within the switching hub without having to perform hardware or software upgrades to the implementation every time a new module is introduced. A highly desired goal is to accommodate and protect any future scaling that the network manager may make in the networking equipment.

Providing a local area network switching hub (concentrator) which is active and running 100% percent of the time is a long sought after goal. Local area networks must be up and running in order that communication over the network can take place. One obvious point of failure is the possibility of a power problem at the switching hub, thereby disrupting all links connected by modules to the switching hub.

The use of redundant elements is well established as a means for avoiding down time. Often, lines to and from the stations are provided in a redundant manner (transmission, reception lines). Redundant power elements and redundant controller elements are also generally known. This is an extra or additional power supply which is held in waiting as a back-up power supply, in case of the failure of the primary power supply.

Often, local area networks are established using a switching hub and are later modified. Further, the power requirements of newer modules continues to change such that systems which are set up with a redundant power supply, often do not have the requisite power to be fault tolerant. That is, failure of the power supply also occurs in situations where a full backup power supply is not available or is not sufficient for the connected modules.

In a hub containing multiple power supply elements, the failure of a power supply element will result in one of 2 outcomes: if the available power at the time of the power supply element failure is more than the amount that the power supply would have been providing, then there is no net change to the power state of the modules installed in the hub. However, if the available power at the time of the power supply element failure is less than the amount that the power supply would have been providing, then a power overload condition exists (i.e., the power required by the power-enabled modules in the hub exceeds the power provided by the remaining operational power supply elements). If no action is taken, then the remaining operational power supply elements may shut-down due to the overload, thereby disrupting all links to modules installed within the hub. The hub remains shut-down until the network manager can get to the hub and replace the failed power supply element. This invention prevents a hub shut-down by automatically sensing the failure of a power supply element and automatically power-disabling individual modules installed in the hub until the power deficit is erased. This is performed without human intervention and ensures that as many of the modules installed in the hub are powered-up as possible. It is a better trade-off to temporarily lose some part of the network versus losing the entire network due to a total hub shut-down.

Similarly, the failure of one or more hub cooling fans or the failure of the wiring closet cooling may cause a hub overheat condition to occur. If no action is taken, then there is a risk that components of power-enabled modules installed in the hub will be damaged due to temperatures exceeding their maximum ratings. In this case, even if the overheat condition is fixed, the network manager must contend with replacing expensive, and potentially mission critical, modules thereby increasing network down-time. This invention prevents this scenario from occurring by automatically detecting the hub overheat condition and automatically power-disabling installed modules to alleviate the overheat condition and prevent damage to expensive, mission-critical modules. This is performed without human intervention and ensures that as many of the modules installed in the hub are powered-up as possible. It is a better trade-off to temporarily lose some part of the network versus losing some part of the network for a longer period due to permanent damage to one or more modules installed in the hub.

For both power supply element failures and hub overheat conditions, this invention accommodates future (as yet to be designed) modules without any updates to the hardware or software implementation.

SUMMARY AND OBJECTS OF THE INVENTION

It is the object of the invention to provide an automated, real-time, intelligent power management system for a local area network switching hub which continually performs the discovery of power supply and component element types to establish an available power budget; establishes the power demand of modules and other entities which require power on the system, and allocates and deallocates power in an intelligent manner as hub conditions change (e.g., module insertion or removal, power supply element failure or recovery, hub cooling overheat or recovery.

It is an object of the invention to provide an intelligent power management system for a switching hub including electronic modules (payload), which system can deliver electrical power from finite power sources in order to handle an ever increasing need for electrical power in switching hubs.

A further object of the invention is to provide an automated, real-time, intelligent power management system which includes redundant power sources for systems operation, to ensure a fault recovery process, and to ensure fault recovery as to critical systems such as networking equipment.

It is a further object of the invention to provide an automated, real-time, intelligent power management system for switching hubs which continually monitors and reacts to environmental changes (such as the failure of one or more power sources) and prevents down-time for an associated local area network and prevents down-time with regard to all mission-critical system components.

According to the invention, a power management system for local area network hubs comprises a network switching hub including a connection backplane with a plurality of connection slots for electronic modules that constitute the hub payload, and connection slots for intelligent modules such as a hub controller module. The hub includes a power supply having one or more elements providing a maximum power available for the system. Each power supply element has a memory providing power supply element type information from which power delivery capability is derived.

Power management is implemented using an intelligent module such as a hub controller module, which provides basic physical services and without which other modules of the switching hub will not operate. This module provides a locus of all physical indications and information required with regard to managing the concentrator environmental parameters including power, cooling and temperature. The power management is implemented through a hub controller module whereby all other modules that assume an agent role in a managed concentrator (intelligent hub) are able to request services through a hub controller management interface. Through the hub controller management interface, a running inventory is maintained with regard to available power based on the total power available from the power supplies to the concentrator. This inventory is changed on the status of power supply elements and modules which are powered up in the concentrator. The hub controller module processor determines available power by collecting the power supply element type information for each power supply element installed in the hub. The power delivery capability for each power supply element is derived from the type information and a total available power budget determined. Power supply elements installed in the hub add incremental amounts to the available power budget based on the power supply dement type and capacity. All power supply elements installed are online and delivering power to the hub. In addition each power supply element is an autonomous entity in the event of the failure of other power supply elements. This represents a fault tolerant mode of operation of the power supply as a whole, based on the autonomous operation of the individual power supply elements. Using this quality, power supply elements and their delivered total available power budget can be intelligently managed to provide power supply element fault tolerance using an N+M power supply element reservation scheme. Where only the power delivery capability of N power supply elements of the N+M installed in the hub are used for deriving the available power budget for intelligent power management, the M power supply element power delivery capability being held in reserve, to be available in the event of any power supply element failure.

Manageable modules are connected to the switching hub. Each of the manageable modules has a memory providing information as to the power requirements of the module. A controller module is connected to the manageable modules via the switching hub. The controller module includes memory means for receiving data representing the manageable modules power requirements. Microprocessor means is provided for calculating power requirements of the system and for controlling the supply of power to each of the modules. The microprocessor can evaluate the data to determine the available power budget and disable and enable power to the modules and generally control power allocation.

The manageable modules each include a power control circuit. The controller module is connected to the power control circuit of each of the manageable modules for controlling a supply of power to each of the manageable modules. The controller module includes module presence sensing means, connected to each of the connection slots for determining whether a module is connected to each of the connection slots. This information may be stored and used for allocation of power. The controller module is also preferably connected to temperature sensors located at positions in the switching hub. The controller module processor power disables slots upon receiving temperature sensor data over a set threshold.

The controller module processor determines available power after determining the power allocation. The controller module may reserve the power delivery of power equal to the power allocated to reserve an amount of necessary power in case of primary power failure.

A distributed management module is preferably connected to the switching hub backplane for collecting data from the controller module for displaying the data. The management module establishes a priority scheme for modules connected to the backplane including assigning a power class to each module connected to a slot. The controller module processor power enables and power disables slots with modules connected thereto, dependent upon the power class of the various modules connected thereto.

Unmanaged modules may also be connected to slots of the backplane (modules which do not include a memory device providing power consumption information and which cannot be power enabled and power disabled). The unmanaged modules are assigned a highest power class value whereby modules with lower power class values are power disabled before those with higher power class values. The distributed management module accesses power required by un- or non-manageable modules and transmits power value data to the controller module for the non-manageable modules. The controller module receives the power value for updating the power budget including power allocated and the available power budget.

Power management serves to: (1) determine power available, (2) monitor hub power utilization on a hub and per-slot basis, (3) react to hub environmental changes to power supply units, cooling, etc., and (4) service power management configuration requests from the Agent. The system provides for a controller module which is responsible for all power management activity with the hub. All hubs require the presence of at least one Controller Module (two for redundancy termed redundant controller module— RCM) to provide all the basic physical services for the hub including backplane clock signals and slot power, and to monitor and manage the hub environmental parameters of power, cooling and temperature. When acting as the hub agent, the Distributed Management Module (DMM) requests services of power management through the Controller Module management interface.

The various features of novelty which characterize the invention are pointed out with particularity in the claims annexed to and forming a part of this disclosure. For a better understanding of the invention,its operating advantages and specific objects attained by its uses, reference is made to the accompanying drawings and descriptive matter in which a preferred embodiment of the invention is illustrated.

DETAILED DESCRIPTION UNDER PREFERRED EMBODIMENTS

Figure 1:
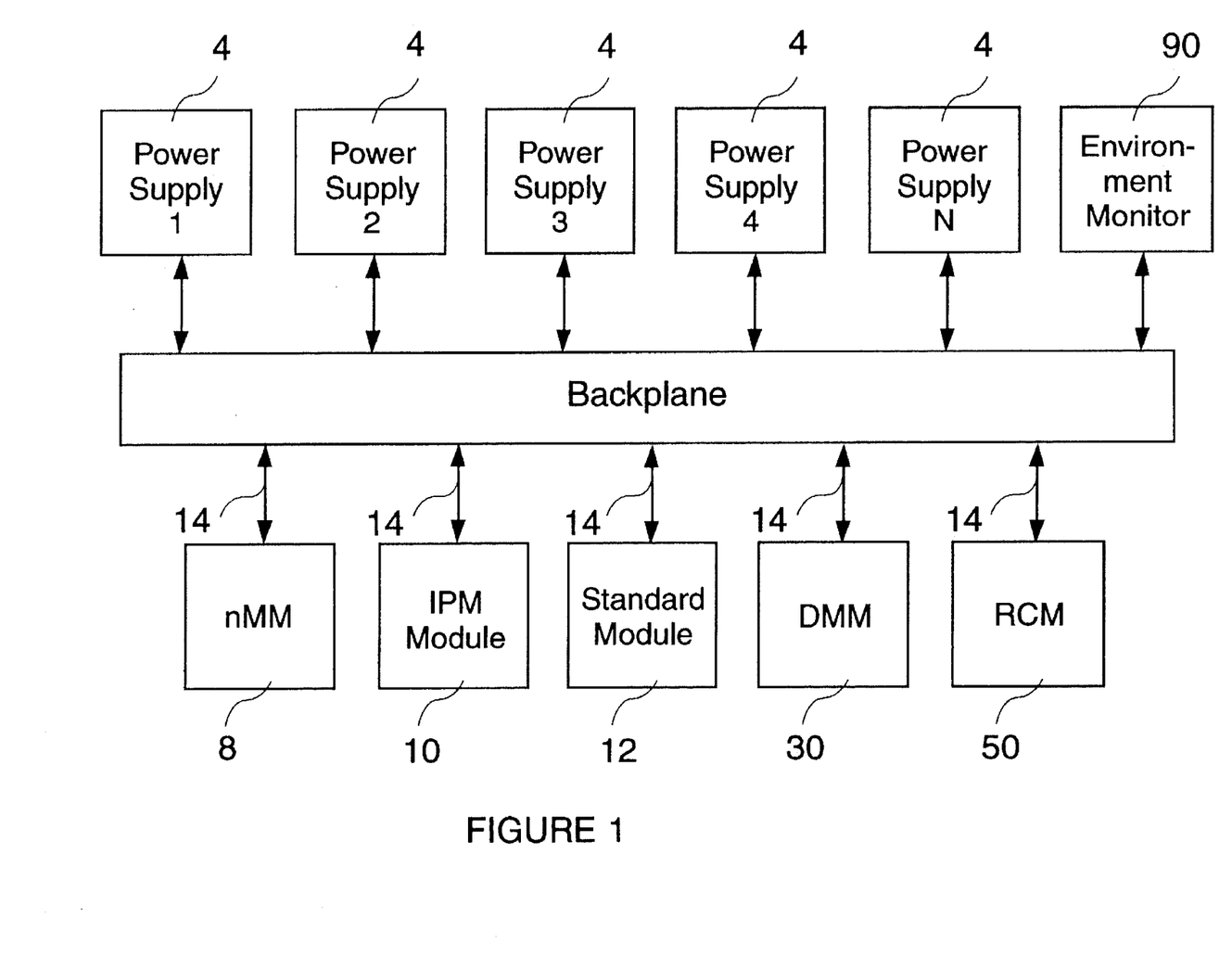
FIG. 1 is a schematic circuit diagram showing elements of the intelligent power management system according to the invention.

Referring to the drawings in particular, FIG. 1 shows a local area network switching hub according to the invention including a backplane 2, a power supply with power supply elements 4 and a plurality of modules 8, 10, 12, 30 and 50. The modules 8, 10, 12, 30 and 50 and power supply elements 4 are shown connected at different sides of the backplane only for ease of representation. All elements connected to the backplane may be connected at a single side or at different sides. Connections between the backplane and the modules 8, 10, 12, 30 and 50 is preferably via slots 14 (e.g. a housing with locations for receiving modules) with each slot having a connection element such as female elements for receiving connection pins provided on the module. Connection to the backplane 2 allows local area networks (such as Ethernet, Token Ring, etc.) to be configured. The modules may be connected into the backplane based on a management entity associated with the intelligent switching hub such as management module 8 or 30. The modules also connect to one or more of various power rails. The power rails provide various power levels (such as +5 volts, +12 volts, etc.).

Modules that contain a non-volatile memory device 20 (see FIG. 2) participate in Intelligent Power Management. The non-volatile memory device 20 contains essential information about the module, including, but not limited to, the amount of power the module requires for each of the power rails (such as +5 volts, +12 volts, etc) available to the module. Modules that contain a non-volatile memory device 20 include module 10, module 30 and module 50.

The switching hub itself contains a non-volatile memory device 60 (see FIG. 2), allowing the hub itself to participate in Intelligent Power Management. The hub non-volatile memory device 60 contains essential information about the hub, including, but not limited to, the amount of power the hub requires for each of the power rails (such as +5 volts, +12 volts, etc.) available to the hub. The hub power requirements exclude any modules connected to the backplane 2 and account for the power required by hub components such as cooling fans.

Figure 2:
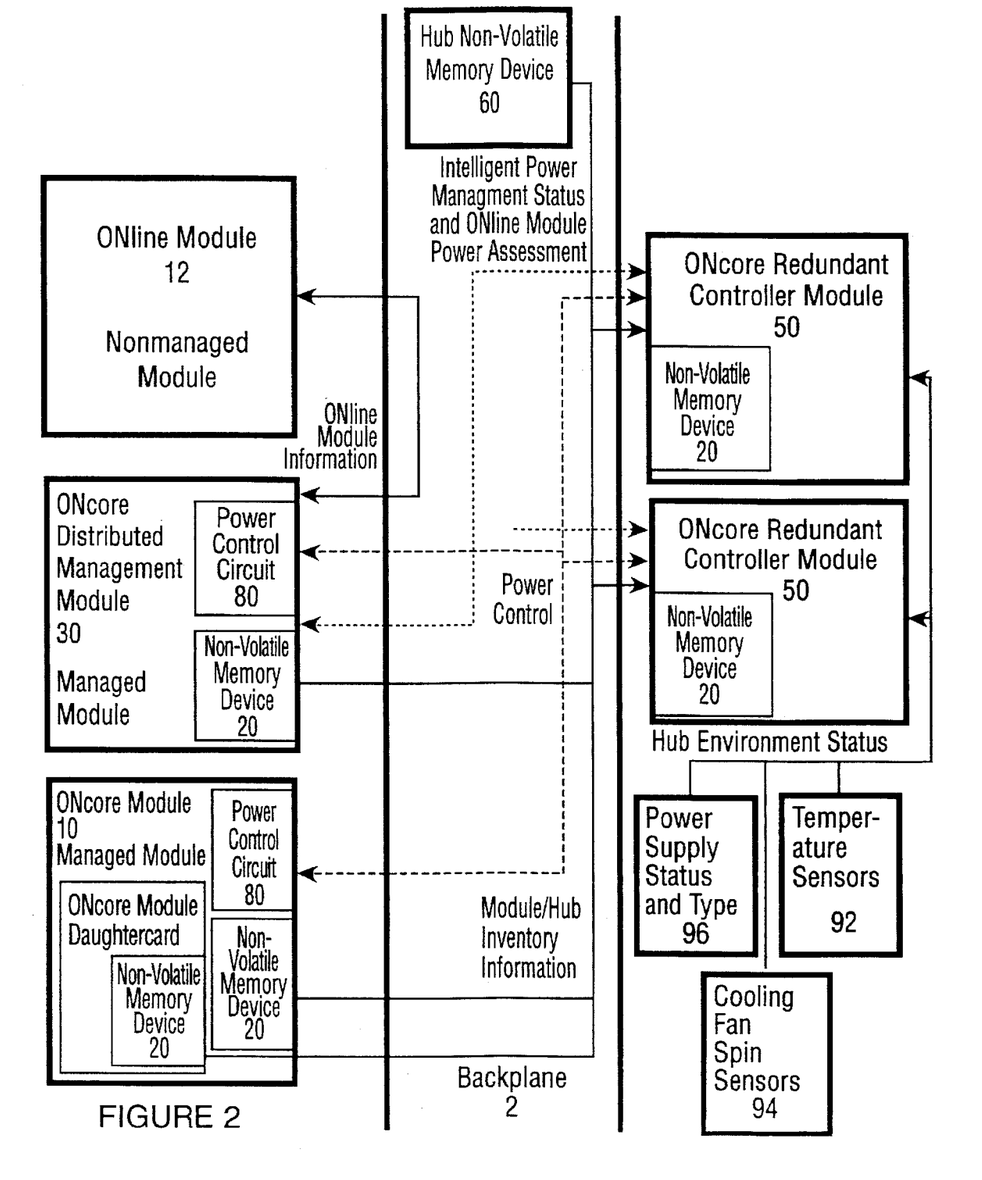
FIG. 2 is a diagram showing connections over the backplane.

Modules that can be managed by Intelligent Power Management also contain a power control circuit 80 (see FIG. 2). These modules include module 10 and module 30. The Redundant Controller Module (RCM) 50 is connected to the power control circuit of each module 10 and module 30 for controlling a supply of power to the module. The module that implements Intelligent Power Management, namely the RCM 50, does not contain a power control circuit 80.

Module 12 is a standard module (also referred to as unmanaged module herein) which is not designed for the intelligent power management system according to the invention. Module 12 does not contain a non-volatile memory device 20, nor does it contain a power control circuit 80. Hence, module 12 is not power manageable. Nevertheless, such a module can be used with the hub of the invention, for a connection to a local area network configured over the backplane 2. Module 10 is designed for intelligent power management (IPM). Each of the modules 10 include a non-volatile memory device 20 and a power control circuit 80. Modules 10 and 12 may be one of various module types such as a media module, bridge, router, backbone connection module, etc. A plurality of such modules 10 and 12, in any mix, may be connected to the backplane 2.

Module 8 is a network management module (NMM), a module also not designed specifically for the intelligent power management system according to the invention. Like module 12, module 8 does not contain a non-volatile memory device 20 or a power control circuit 80 and, hence, is not power manageable. This module 8 may be used in the hub with intelligent power management features as described herein.

Module 30 is a Distributed Management Module (DMM) which is designed specifically for the intelligent power management system. Like module 10, module 30 contains both a non-volatile memory device 20 and a power control circuit 80. Module 30 (DMM) provides a user management point for the intelligent power management system.

Intelligent power management may be implemented based on the information contained in each of the module's non-volatile memory device 20 describing the module type and its power requirements for each of the power rails that are available in the system (such as +5 volts, +12 volts, etc.).

Figure 3A:
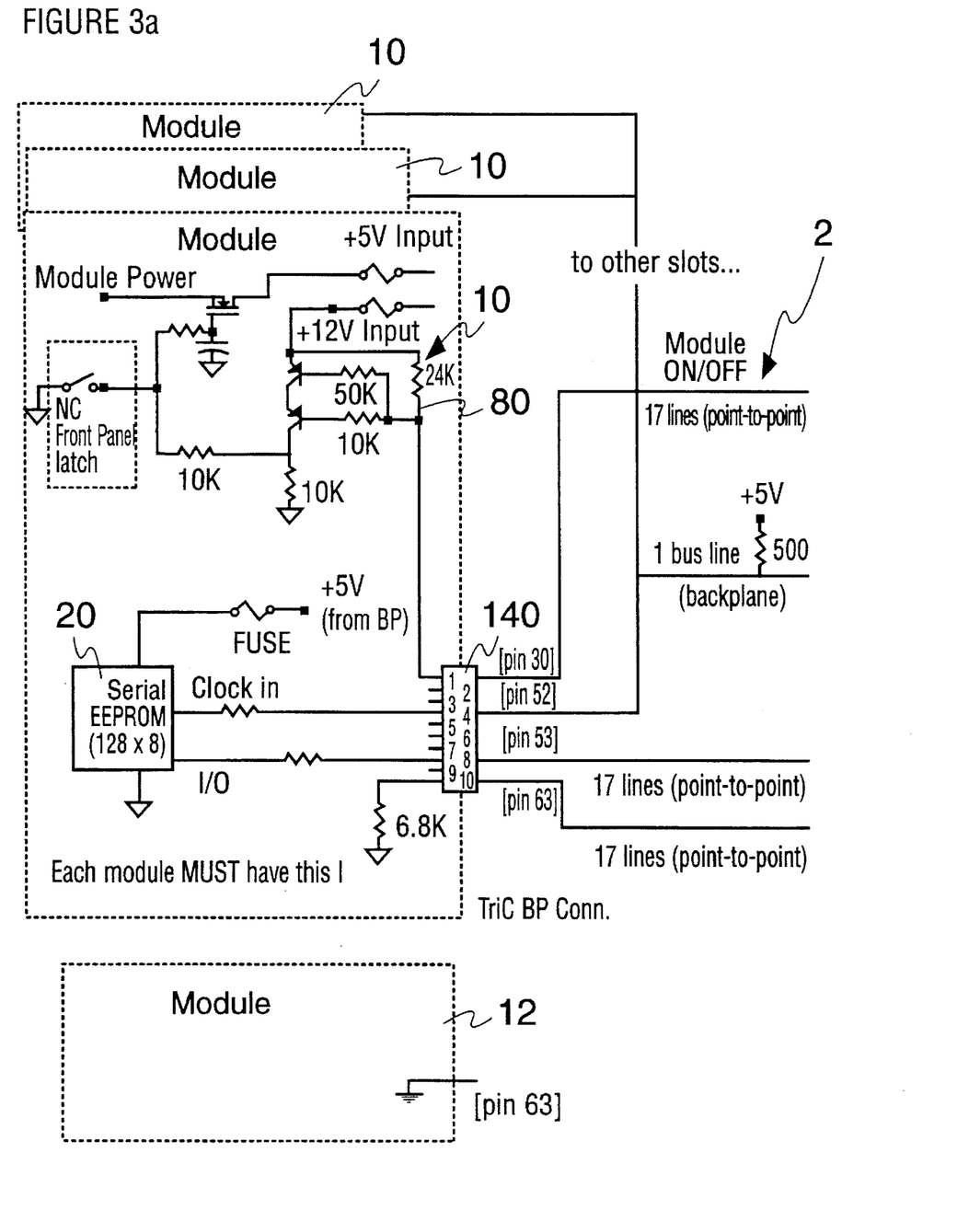
FIGS. 3a and 3b are a schematic diagram showing sensing and control by a controller module according to the invention.
Figure 3B:
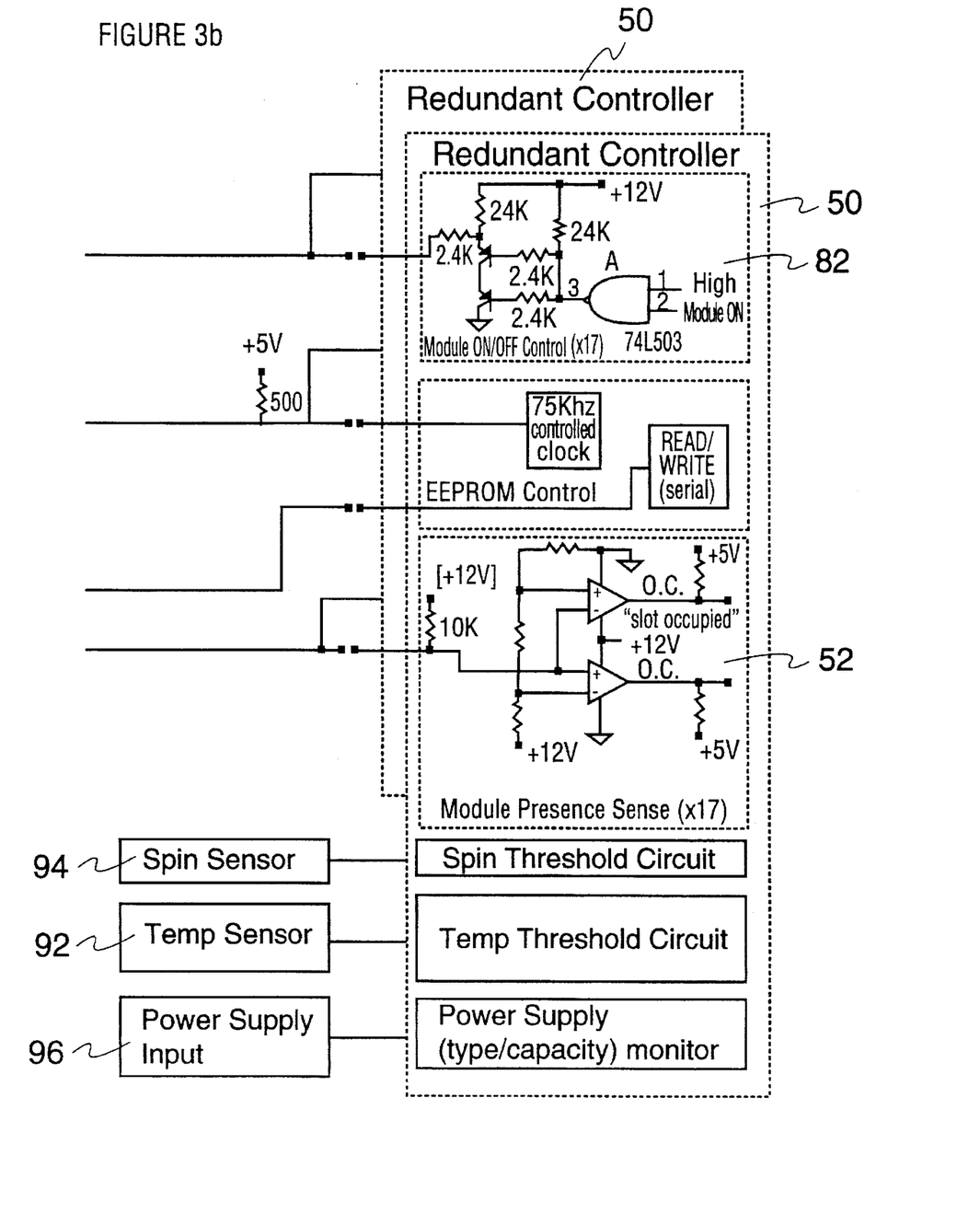

A redundant controller module (RCM) 50 is provided which includes a plurality of slot sensing circuits 52 (see FIG. 3a, 3b). The slot sensing circuits 52 are equal in number to the slots available for payload modules. Sensing circuits 52 allow sensing as to whether the slot is occupied and the type of module (e.g. can its power delivery be managed?). For example, pin 63 of the slot connector 140 is monitored. A voltage level in a first range (e.g. of +10 to 13.5 volts) entails that the slot is empty. A voltage level in a second range (e.g. of +4 to +10 volts) indicates the presence of an IPM module (e.g., module 10 or module 30). A voltage level in a third range (e.g. of 0 to +1 volts) indicates the presence of a standard module (e.g., module 12 or module 8).

The power supply elements 4 set the basic mount of power available for the entire system. According to the invention, power may be provided in discrete elements such as a power system which can have from 1 to n power supply elements 4. The number and type of power supply elements which are provided is sensed via status/type input 96, whereby the redundant controller 50 provides the basis for determining the available power budget.

The RCM 50 makes a connection to the backplane 2 similarly to the connection made by modules 8, 10, 12 and 30. This connection also provides additional pins (lines) for implementing intelligent power management as described herein. These additional pins include pins for a point-to-point connection between each payload slot connector 140 and the slot sensing circuits 52, pins for a point-to-point connection between each payload slot connector 140 and the slot power control circuits 82, and pins for a point-to-point connection to each payload slot connector 140 for communicating with the non-volatile memory device 20 on a manageable module (e.g., module 10 and module 30) and the hub non-volatile memory device 60. Additional pins are provided to allow the RCM 50 to monitor the status and type of each power supply element 4, the temperature status reported by each temperature probe, and the status of each cooling fan.

Through the backplane connection, the RCM 50 communicates with every module and hub non-volatile memory device and retrieves the module/hub information. The RCM contains a processor 70 and embedded software and processes the sensed and retrieved data as described below. The RCM 50 is the locus of all power management activity within the hub in both managed and unmanaged environments. The RCM 50 provides power management status to the DMM 30 on a hub-wide basis as well as on a per payload slot basis. The RCM 50 also services DMM 30 requests to change a slot's power class, enable/disable power to a specified slot, enable/disable power fault-tolerant mode, enable/disable overheat automatic power-down mode, and update the power budget based on new unmanaged power allocation values (these features are described in detail below). When the hub is configured with 2 RCMs, both the active and standby RCM 50 perform the same power management algorithms to ensure that, upon an active RCM 50 failure and subsequent switchover, the new, active RCM 50 can seamlessly assume control without disrupting power to slots that are already power-enabled.

The Distributed Management Module (DMM) 30 provides the user management point for the intelligent power management system. The DMM 30 collects status data from the RCM 50 and displays the data in a meaningful manner to the user. The DMM 30 enables and disables the features of the intelligent power management system, including power to an individual slot, power fault-tolerant mode and overheat automatic power-down mode. This affects the software processes performed by the RCM 50. The DMM 30 allows the user to define a module power-up/power-down priority scheme that is best suited to the hub "payload" module configuration. The structure and purpose of such a scheme are described below in detail. The DMM 30 determines the power requirements of "payload" modules which do not include a non-volatile memory 20 (e.g., module 8 and module 12). The DMM 30 notifies the RCM 50 of these values. The DMM 30 notifies the user of power utilization (i.e., low power remaining for each power rail available to the system) and changes in power fault-tolerant mode operational status.

Referring to FIG. 2, the DMM 30 and RCM 50 exchange intelligent power management information via the slot connection 14 made to the backplane 2. Through this backplane connection, the DMM 30 can notify the RCM 50 to enable or disable features of intelligent power management, to establish a module power-up/power-down priority scheme, and of the power requirements of unmanaged modules (e.g., module 8 and module 12) that lack a non-volatile memory device 20. The backplane connection allows the RCM 50 to notify the DMM 30 of changes in the available power budget, payload slot status, and hub environmental status (e.g., power supply element 4 status, temperature status, and cooling fan status).

The RCM 50 automatically saves the state or value of any power management feature configurable or changeable by the DMM 30 in the hub non-volatile memory device 60. The following represent power management configuration data maintained by the RCM 50:

Power Fault-Tolerant Mode
Overheat Automatic Power-Down Mode
Slot Power State
Unmanaged Module Power Allocation
Slot Type (i.e., Manageable/Unmanageable/Empty)

It is noted that this configuration data is not saved locally on the DMM 30; it is only maintained by the RCM 50 in the hub inventory EEPROM 60. This information is needed by the RCM 50 after a hub is reset and before any modules are power-enabled, hence, its placement in the hub inventory EEPROM 60. Except for slot type information, the data can be configured to meet specific hub power requirements. Whenever this intelligent power management configuration information is changed by either the RCM 50 or the DMM 30, the RCM 50 automatically saves the data in the hub inventory EEPROM 60; no action (like issuing the save command) is required on the EEPROM part of the DMM 30. By automatically saving this power management information, the data is consistent across hub resets, allowing the hub to return to its previous power states.

The following describes the basic features of intelligent power management.

Power Fault-Tolerant Mode is used by the DMM 30 to enable/disable power fault-tolerance. When this mode is enabled, and multiple power supply elements 4 are present such that at least one power supply's worth of power is available, the RCM 50 will reserve the power delivery capability of one power supply from the available power budget. If at least one power supply's worth of power is unavailable, then the RCM 50 will not enter power fault-tolerant mode until sufficient power is available. Power fault-tolerant mode state data is automatically stored in the hub inventory EEPROM 60 whenever it changes.

Overheat Automatic Power-Down Mode is used by the DMM 30 to enable/disable the automatic power-down of modules 10 (which include nonvolatile memory 20), during an overheat condition in the hub. When this mode is enabled, the RCM 50 will automatically power-disable slots containing modules 10 by slot power class and slot location when an overheat condition exists in the hub. By automatically power-disabling modules 10 via the power control circuit 80, the RCM 50 is attempting to alleviate the overheat condition as well as protect critical modules from damage due to the overheat condition. If this mode is disabled, then user intervention is required to alleviate the overheat condition and protect critical modules from damage. Overheat automatic power-down mode state is automatically stored in the hub inventory EEPROM 60 whenever it changes.

Slot Power State represents the power state (i.e., enabled/disabled/pending) of each payload slot in the hub as maintained by the RCM 50. The DMM 30 can request the RCM 50 to power-disable slots and power-enable slots via power control 82 and power control circuits 80. When a slot containing a module 10 (with non-volatile memory 20) is power-enabled by the DMM 30, the RCM 50 will enable power to that slot if and only if sufficient power is available to meet the power requirements of the module located in the slot. If there is sufficient power, then the RCM enables power to the slot via power control circuit 82, which connects to the module's power control circuit 80, and marks the slot as power-enabled. If there is insufficient power, the slot is marked as power-pending and remains power-disabled by the RCM 50 until sufficient power becomes available. When a slot containing a module 10 is power-disabled by the DMM 30, the RCM 50 will disable power provided to the slot via the power control circuit 82 connecting to the module's power control circuit 80. Slot power state data is automatically stored in the hub inventory EEPROM 60 whenever it changes.

Unmanaged Power Allocation is provided according to the invention for modules such as modules 12 which are not power manageable; they do not carry an on-board inventory EEPROM 20 nor can power be disabled to a slot containing such a module 12. When such a module 12 is inserted into a hub slot, it immediately consumes power; the RCM 50 knows that the slot contains such a module 12, but it cannot determine the type of module 12. As a result, the RCM 50 relies on the DMM 30 (agent) to accurately assess the total power required by the modules 12 present in the hub. The DMM 30 maintains a static table of power requirements for all modules 12 and the total power requirements for the modules 12 present in the hub. The DMM 30 will re-assess the module 12 power requirements whenever it gains hub mastership due to some form of reset (hub, device, mastership) or whenever a module 12 is inserted or removed from the hub. The DMM 30 then notifies the RCM 50 of the new assessment (these values are collectively called unmanaged power allocation). When the RCM 50 receives these unmanaged power allocation values, it updates its power budget accordingly. This configuration data is automatically stored in the hub inventory EEPROM 60 whenever it changes.

Slot power class is configured by the DMM 30 to establish the order of payload slot power enable and disable. Slots containing modules 10 or 30 assigned to Power Class 1 are the first to be power-disabled. Slots containing modules 10 or 30 assigned to Power Class 10 are the first to be power-enabled. Slot power class is not applicable to a slot containing a module 12 or 8 as these modules are not power-manageable. Slot power class data is automatically stored in the hub inventory EEPROM 60 whenever it changes.

For each payload slot, slot type indicates whether the slot is empty, occupied by a power-manageable module (module 10 or module 30), or occupied by an unmanaged module (module 12 or module 8). This information is maintained solely by the RCM 50; it cannot be altered by the DMM 30. Slot type data is automatically stored in the hub inventory EEPROM 60 whenever it changes.

The system of the invention including DMM 30, RCM 50 and memory devices for each module 10 provides the basis for various software processes.

OPERATION

In general, whatever is stated about module 10, applies to module 30. Same issue for module 12 and module 8. Upon hub reset or power-up, the following conditions exist: all slots containing Modules 10 are power-disabled, and all slots containing modules 12 are power-enabled (because modules 12 are not power-manageable). The RCM 50 determines its initial power budget based on the operational power supplies. The RCM 50 receives data as to the type and capacity of each power supply 4 via input 92, connecting to the power supplies 4 over the backplane 2. RCM 50 also gathers inventory information from the hub inventory EEPROM 60, its own on-board inventory EEPROM 20, and the inventory EEPROM 20 for module and daughtercard. The inventory EEPROM for a module 10 or hub contains the module's/hub's power requirements in units of watts for each voltage line. The RCM 50 immediately reduces its power budget by the power requirements of 2 RCM 50s, regardless of whether there is actually a second RCM 50 in the hub, and the hub itself (e.g., the fan units draw power off +12 V). Since an RCM 50 is vital to hub operation and always consumes power (like a non-managed module), this method guarantees that the hot-insertion of a second RCM 50 does not impact hub operation in any way.

The RCM 50 also reads the saved power management configuration data from the hub inventory EEPROM 60. The RCM 50 verifies the data validity by comparing the saved slot profile against the current slot profile. This comparison is limited to verifying that for a given slot, the type of module (i.e., module 10, module 12, or empty) that is currently present in the slot matches the configuration data for the slot. If the slot profiles match, then the RCM 50 first reduces its power budget by the saved unmanaged power allocation. For each slot, it then restores the slot's power class and power state, if possible. Note that slots containing Modules 10 are power-enabled in order of power class (class 10 slots, then class 9 slots, and so on) based on the available power. It is possible that the RCM 50 will not be able to restore power to slots that were previously power-enabled if a power supply failed during the hub reset or power-cycle. After the slot power states are restored (as much as the power budget allows), the RCM 50 will restore the overheat automatic power-down mode and power fault-tolerant mode. In the case of power fault-tolerant mode, if it was previously enabled and sufficient power is available, then the RCM 50 will re-enter this mode; otherwise, until sufficient power is available, the hub will not operate in power fault-tolerant mode. By configuring power fault-tolerant mode last, the RCM 50 has power-enabled as many modules 10 as possible.

If the slot profiles don't match, then the RCM 50 discards all the saved power management configuration data and configures from default mode. Searching from lowest to highest slot by power class, the RCM 50 power-enables the slot containing the DMM with the highest default power class (typically all Modules 10 have a default power class of 3; hence, the left-most slot containing a DMM 30 will be power-enabled first). If no Modules 12 are present in the hub, or there are no DMMs 30 in the hub, the RCM 50 will continue to power-enable slots containing Modules 10 from lowest slot to highest slot in order of default power class within the limits of the power budget. If at least one module 12 is present, the RCM 50 will not power-enable any more slots containing modules 10 until it has elected a master DMM 30 and received the first group of unmanaged power allocation values from the DMM for the Modules 12 present in the hub. Once this initial assessment is received, the RCM 50 will power-enable slots containing modules 10 from lowest slot to highest slot in order of default power class within the limits of the power budget. The RCM 50 then sets power fault-tolerant mode and overheat automatic power-down mode to their default state: disabled.

The RCM 50 maintains a power budget representing the amount of power unused by power-enabled modules in the hub and, for each slot containing a managed module, the total power required by the managed module (the sum of the power requirements of the motherboard plus all installed daughtercards. This is derived from the inventory data gathered by the RCM 50). This running assessment of power availability is then used by the RCM 50 to determine whether it can safely power-enable a slot containing a power-disabled module 10 or a slot'that has been hot-inserted with a module 10. The power budget is maintained and reported to the DMM 30 in units of watts on a per voltage basis (i.e., +5 V, −5 V, +12 V, −12 V, and +2 V) and represents the difference between the output of all operational power supplies 4 and all modules that are power-enabled in the hub (RCM 50 will immediately reduce the power budget by the power requirements of the hub itself and the power requirements of 2 RCM 50s before applying power to slots containing modules 10).

The RCM 50 continues to report updated power budget values as slots are power-enabled and power-disabled and modules are inserted or removed from the hub. During a power deficit in which demand exceeds available power, power budget values reported by RCM 50 will not be less than 0.

The RCM 50 is capable of physically enabling or disabling power to slots occupied by modules 10 as part of the overall power management scheme. However, it has no control over slots containing modules 12 or 8; once such a module 12 is inserted into the hub, it immediately utilizes hub power for as long as it remains in the hub. The RCM 50 will enable or disable power to a slot containing a module 10 in response to DMM 30 requests or to a change in the hub environment such as the failure or recovery of a power supply element 4 or a hub overheat condition in which overheat automatic power-down mode is enabled.

Each hub slot containing a module 10 can be assigned a power class ranging from 1–10 to establish a managed module power-up and power-down priority scheme. Power class in conjunction with slot location defines the order in which hub slots will be power-enabled and power-disabled. Slots assigned lower power classes will be power-enabled AFTER slots assigned higher power classes. Similarly, slots assigned lower power classes will be power-disabled BEFORE slots assigned to higher power classes. For example, using the available power budget, slots assigned power class 10 will be power-enabled before slots assigned power class 9, and so on. Similarly, slots assigned power class 1 will be power-disabled before slots assigned power class 2, and so on.

Note that slots assigned power class 10 will be power-enabled before any other slots, but they will not be power-disabled automatically (e.g., due to a power supply failure) unless explicitly requested by the DMM 30. It is recommended that this class be used prudently as power class 10 effectively defeats some important power management features like power-disabling slots containing modules 10 in the event of a power deficit due to a power supply failure. When a power supply fails, and there are a sufficient number of slots assigned power class 10, then the RCM 50 may not be able to erase the power deficit. This could result in a hub shut-down due to a power overload.

Note that when a managed module is inserted into the hub, its slot's initial power class is assigned the power class defined in the motherboard's inventory EEPROM 20. The DMM 30 is able to change this class level to satisfy a desired module power-up and power-down strategy. Also, note that modules 12 do not receive a power class as they always receive power.

Increasing or decreasing a slot's power class doesn't affect the power state of the slot or the power states of other slots. If the slot is already power-enabled, changing its power class will take effect during a slot power-down condition (due to a power supply failure, for example). If the slot is power-disabled, the new power class will take effect during a slot power-up condition (e.g., power supply recovery).

In a hub containing multiple operational power supplies, the DMM 30 has the ability to reserve one power supply's worth of power for fault-tolerant operation. By enabling this feature, a failure of a single power supply will not have an effect on hub operation. All slots that were previously power-enabled remain power-enabled. In contrast, if the feature is not enabled, and a power supply failure occurs to cause a power deficit, one or more slots containing Modules 10 will be power-disabled by the RCM 50 to erase the deficit.

If this mode is enabled by the DMM 30, the RCM 50 verifies that there is sufficient available power to enter this mode. If there is sufficient available power, the RCM 50 reserves one power supply's worth of power by reducing the power budget by that amount. If insufficient power is available, the RCM 50 will automatically enter power fault-tolerant mode once sufficient power becomes available. Note that regardless of whether the hub is operating in power fault-tolerant mode, all operational power supplies are still physically enabled and sharing the power load with each other.

When the DMM 30 disables power fault-tolerant mode, the reserved power is returned to the power budget, and the RCM 50 will power-enable slots containing Modules 10 that are marked as power-pending (disabled, but eligible for power) within the limits of the power budget.

Power fault-tolerant mode remains in effect for as long as the power budget can support it; when the power budget can no longer support it, the RCM 50 reverts to non-fault-tolerant mode. For example, if a hub is operating in power fault-tolerant mode, and more than one power supply's worth of power is still available, a failure of a single power supply will not have any effect on hub operation, and power fault-tolerant mode will remain in effect. If another power supply fails, power fault-tolerant mode will be automatically disabled by the RCM 50. When the power supply recovers, power fault-tolerant mode will be automatically resumed by the RCM 50.

In general, whenever the available power budget increases (e.g., due to installation of another power supply), the RCM 50 will always attempt to power-enable slots containing power-pending modules 10 before enabling power fault-tolerant mode. If the user wishes to operate in power fault-tolerant mode, but there is insufficient power to support it, he will need to either install another power supply into the hub or explicitly power-disable slots containing Modules 10.

When enabling or disabling power fault-tolerant mode, the following table can be used to determine the amount of power that is reserved/restored to the power budget when this mode is enabled/disabled. For each voltage line, calculate the amount of power that is reserved for power fault-tolerant mode as follows: the power reserved is the difference between the power provided by the number of operational power supplies and the number of operational power supplies minus 1. For example, if a hub contains 4 operational power supplies, for example all of the same type, and the DMM 30 enables power fault-tolerant mode, the power reserved on the +5 V line is 184 Watts (735 Watts −551 Watts). Note that there will be some variation in the difference between numbers of power supplies, as there is some variation in the load-sharing overhead attributable to the number of operational power supplies in the hub. Several other power supply types are possible and can be mixed. Table I shows values for a first power supply type only.

TABLE I

| Voltage Line | 1 Power supply | 2 Power supplies | 3 Power supplies | 4 Power supplies |
| --- | --- | --- | --- | --- |
| +5.2 V | 204.0 W | 367.0 W | 551.0 W | 735.0 W |
| +12 V | 48.0 W | 81.5 W | 122.5 W | 163.0 W |
| +2.1 V | 8.4 W | 14.3 W | 21.4 W | 28.6 W |
| −5 V | 15.0 W | 27.0 W | 38.25 W | 51.0 W |
| −12 V | 18.0 W | 30.5 W | 46.0 W | 61.25 W |

The RCM 50 manages and reports hub power states on a slot basis. Power is enabled or disabled to a slot and, hence, to the module inserted there. For purposes of description, slot and module are used interchangeably from a single slot module perspective. For multi-slot modules, the power states of all slots filled by a module will be enabled or disabled together.

The RCM 50 assigns one of three states to any payload slot in the hub. A slot containing a module 12 is always designated as power-enabled as it always consumes power upon insertion. A slot containing a module 10 is designated as power-disabled if either one of its inventory EEPROM's (motherboard or daughtercard) is invalid or a request is made by the DMM 30 to disable power to the slot. Once a slot is power-disabled, it will not be power-enabled under any circumstance unless explicitly requested by the DMM 30. A slot containing a module 10 is designated as power-enabled if and only if the slot is powered-up by the RCM 50. Finally, the RCM 50 will designate a slot as power-pending if it is eligible for power, but there is insufficient available power to meet the power requirements of the module installed in the slot. In this case, the slot remains in the pending state until sufficient power becomes available.

Power class in conjunction with slot location define the order in which modules 10 will be power-enabled and power-disabled by the RCM 50. In general, the RCM 50 power-enables slots containing modules 10 from slot 1 to slot 17, starting with slots assigned the highest power class (Power Class 10). The RCM 50 will attempt to power-enable as many slots containing modules 10 as the power budget permits. For example, if the power requirements of a module 10 at Power Class 8 exceeds the power budget, but the power requirements of a module 10 at a lower power class are within the available power budget, then the RCM 50 will enable power to the slot containing the lower power class a managed module, and the Power Class 8 module will lower power class managed module, and the Power Class 8 module will remain disabled (i.e., power-pending) until sufficient power becomes available.

The RCM 50 will power-disable slots containing modules 10 from slot 17 to slot 1, starting with slots at the lowest power class level (Power Class 1). Slots assigned power class 10 will not be automatically power-disabled by the RCM 50 unless explicitly requested to do so by the DMM 30. This mechanism ensures that critical modules remain power-enabled for as long as possible.

The DMM 30 can modify power classes for all modules 10 present in the hub to define a specific power-up or power-down priority scheme. It is recommended that the slot containing the DMM 30 should be assigned a high power class as well as any other slots containing modules providing network interfaces for the DMM to ensure that the DMM does not lose network connectivity and, hence, SNMP management of the hub during a slot power-down event.

As previously stated, the RCM 50 cannot disable power to a slot containing a module 12; a module 12 always consumes power. When a module 12 is inserted into the hub, the RCM 50 can detect that the slot contains a module 12, but since a module 12 does not contain an on-board inventory EEPROM 20, the RCM 50 is unable to discern the type of module 12 in the slot. Hence, it makes no assumptions about the mount of power a given module 12 consumes; it effectively assigns 0 to the slot's power requirements. This means in a hub containing only modules 12 or a mixture of modules 10 and modules 12 unmanaged or managed by network management module (for example, managed by module 8), the RCM 50 will not be able to verify whether a power deficit exists or is approaching as the user installs modules 12 into the hub. In these environments, the RCM 50 is limited to power-managing slots containing Modules 10; it is up to the user to carefully prepare his site to ensure that his hub has sufficient power for the modules he intends to install. The user should have a spreadsheet/tool that specifies the power requirements of each module 12 to aide in the planning process. The net effect is that the user is allowed to install as many modules 12 into the hub until the power rails collapse, and the hub shuts-down.

If the hub is managed by a DMM 30, the DMM 30 automatically performs a continuous assessment of the power allocated to modules 12 on a per voltage line basis (unmanaged power allocation) as modules 12 are inserted and removed from the hub. The DMM 30 notifies the RCM 50 of the unmanaged power allocation values whenever these values change. The DMM 30 maintains a static table of power requirements of each module 12. When a module 12 is installed in the hub, the DMM 30 assigns default power values to the module (18 Watts on +5 V, 12 Watts on +12 V, the other voltage lines are assigned 0 Watts). Initially the DMM 30 doesn't know what type of module 12 is present in the slot, and it is also necessary to cover for the case in which a defective module 12 is installed in the hub that doesn't respond to DMM 30 polling. When the module 12 initializes and starts responding to DMM 30 polls, the DMM 30 is able to determine the actual power required by this module 12. The DMM 30 updates the total module 12 power assessment values, and notifies the RCM 50 of these revised values. Upon receiving the unmanaged power allocation values from the DMM 30, the RCM 50 updates its power budget accordingly.

It is important to note that if the unmanaged power allocation values results in a power deficit, the RCM 50 will disable power fault-tolerant mode in an attempt to erase the power deficit, but it will NOT power-disable any modules 10. The reason for this is that the user would probably not want his modules 10 power-disabled as the result of a configuration error on his part. Instead, a trap is issued by the DMM 30 notifying the user of a power utilization problem. It should be emphasized that modules 12 are not power-manageable; if a non-managed module is installed to create a significant power deficit, the hub may shut down as a result.

During steady state operation, the primary goals of the power management function are to ensure:

Slots containing Modules 10 are power-enabled only when hub temperature probes do not exceed default or programmed thresholds specified in degrees Centigrade to protect critical networking equipment.

Power usage does not exceed the limits of the power supplies.

Power is budgeted for fault-tolerant operation, when requested.

Slots assigned the highest Power Class remain power-enabled as long as possible.

In the event of a catastrophic failure of power supplies or cooling, hub serviceability will degrade gracefully.

To meet these goals, the RCM 50 must respond to the following events initiated by the DMM 30 or by a change in the hub environment:

A change in the status of 1 or more power supplies (either failure, removal or recovery).

A change in the hub temperature (overheat or recovery).

Removal or insertion of modules.

Selection/de-selection of power fault-tolerant mode.

Enabling/disabling of power to a slot.

Power supply loss is indicated by either an error indication in the power supply operational status or a change in the power supply presence indication to absent. When this event occurs, and power fault-tolerant mode is enabled, there will be no effect on the power-enabled slots. The RCM 50 will report the power supply failure to the DMM 30 and revert to non-fault-tolerant mode.

If the power fault-tolerant mode is disabled, and the currently power-enabled slots require a larger power budget than the operational power supplies can provide, power-enabled slots with the lowest power class will be power-disabled until sufficient power budget is available to support the remaining power-enabled slots. The power-disabling of slots will continue until the power deficit is erased or until all slots containing modules 10 with a power class of 9 or less are power-disabled. Slots assigned power class 10 will remain power-enabled under this condition. The power supply presence and operational status will be reported to the DMM 30. If the RCM 50 is unable to handle a catastrophic power failure due to sagging power rails, then it will be handled by the power management initialization function when the RCM 50 re-boots.

Power supply recovery is indicated by an okay indication in the power supply operational status when the power supply was previously reporting failure status. When this event occurs, the power budget is increased by the power delivery of the recovered power supply minus any overhead attributable to power load-sharing (see Table I). Power-pending slots are then power-enabled to the limits of the available power budget, starting with slots assigned to the highest power class.

If the power fault-tolerant mode is enabled, it will have been lost for the duration of the power supply loss. On power supply recovery, power-pending slots will be power-enabled before an attempt is made to re-enter power fault-tolerant mode.

Behind each cooling fan in a hub designed for the intelligent power management system of the invention (IM hub), there is a temperature sensor 92 that measures the temperature of the fan's exhaust and, hence, provides an accurate indication of the hub internal temperature. While all fan units share the load of cooling-down the entire hub, the fan units and temperature probes 92 co-located behind the slots effectively divide the hub slot area into 3 overlapping temperature zones consisting of a group of slots. The slot overlap reflects the overlapping cooling effects from adjacent fan units. For each PM hub type, the table below specifies the mapping of slots to temperature zones. Note that temperature zone numbering is the same as fan unit numbering. When facing the back of the hub, fan 1 is the left-most fan unit and, hence, covers temperature zone 1. Facing the front of the hub, fan 1 is the right-most fan unit. Table II shows for a 17 slot hub the correspondence of payload slots to temperature zones. There are three temperature zones in a 17 slot hub.

TABLE II

| Slot | 17-Slot Hub Temperature Zone Assignment |
| --- | --- |
| 1 | 3 |
| 2 | 3 |
| 3 | 3 |
| 4 | 3 |
| 5 | 3 |
| 6 | 2,3 |
| 7 | 2,3 |
| 8 | 2,3 |
| 9 | 2 |
| 10 | 1,2 |
| 11 | 1,2 |
| 12 | 1,2 |
| 13 | 1,2 |
| 14 | 1 |
| 15 | 1 |
| 16 | 1 |
| 17 | 1 |

The RCM 50 periodically monitors the hub temperature probes 92 and performs hysteresis on the data obtained from them. An overheat condition exists when one of the temperature sensors exceeds a predefined threshold of 60° C., which is a fixed value to prevent module meltdown, after the filtering performed by hysteresis. An overheat condition may be caused by a cooling fan failure (sensed by cooling fan spin sensor 94) or greater than acceptable ambient temperatures where the hub is installed. If a DMM 30 is present in the hub, it will be informed of the over-temperature condition. If overheat automatic power-down mode is disabled, no further action is taken by the RCM 50. DMM 30 will continue to generate periodic overheat traps to the user, but it is up to the user to take action on the overheat condition. All slots that were previously power-enabled remain power-enabled; hence, there is risk that critical modules will be damaged by the excessive temperatures.

If the overheat automatic power-down mode is enabled, the RCM 50 will delay one minute before taking any action. The one minute delay is provided to allow the DMM 30 to communicate the imminent shutdown to external management entities. After 1 minute, the RCM 50 will power-disable sufficient slots containing modules 10 in the temperature zone reporting the overheat condition to reduce the +5 V power consumption by at least 50 Watts (the reduction of power consumption by 50 Watts was chosen since this should provide a 2° C. drop in temperature at the temperature probe). Within the temperature zone, slots assigned the lowest power class will be power-disabled first, starting from the highest numbered slot within the zone and down to the lowest numbered slot within the zone. Slots assigned power class 10 will remain power-enabled during an overheat condition. The RCM 50 can only take this action on slots containing modules 10; the RCM 50 cannot power-disable slots containing modules 12. After the initial slot power-disable strategy, the RCM 50 then allows the hub temperature to stabilize for 15 minutes before further action is taken. If after 15 minutes the temperature is not below 60° C. overheat threshold, all slots in the temperature zone containing modules 10 with an assigned power class of 9 or less will be power-disabled. The slots will remain power-disabled until the overheat condition in the temperature zone recovers.

If the DMM 30 disables overheat automatic power-down mode during any stage of this automatic power-disable strategy, the RCM 50 will power-enable those slots that were power-disabled due to the overheat condition within the limits of the available power budget.

Each temperature zone is treated independently of the other. For slots that overlap 2 temperature zones, if an overheat condition occurs in both temperature zones, slots located in the overlapping areas will remain power-disabled until the overheat condition recovers in both zones.

Note that if a DMM 30 is present, it will generate temperature warning traps at temperatures above 45° C. to warn the user of a potential overheat condition and head-off a possible action taken by the RCM 50 as described above.

While slots containing modules 10 are power-disabled due to a temperature zone overheat condition, the RCM 50 continues to read the temperature probes and perform hysteresis on the data read. If the temperature probe that had detected an overheat condition reports that the current temperature is below 60° C. overheat threshold, the overheat condition is considered to have recovered, and the RCM 50 will power-enable the slots containing modules 10 to the limits of the available power budget. Within the temperature zone, slots assigned the highest power class are power-enabled first, starting with the lowest numbered slot within the zone and up to the highest numbered slot within the zone.

A new module inserted into the hub may be power manageable (i.e., module 10) or may be a module 12 that does not support this function. The following sections discuss both cases.

Unmanaged modules do not support power management. All Modules 12 fall into this category. Notification of module insertion and type (i.e., non-managed module) will be reported to the DMM 30. When a module 12 is inserted into the hub, one of two events will occur. These are described below, together with the actions taken by the RCM 50.

As previously mentioned, the RCM 50 makes no assumptions about the power consumed by an inserted module 12. When a module 12 is inserted into the hub, it consumes power for as long as it remains in the hub. Regardless of whether a DMM 30b is present in the hub, when a module 12 is inserted into the hub such that a power deficit exists (the power deficit may not be known to the RCM 50 as it assigns 0 power requirements to a slot containing a module 12), the power rails will either hold together, or they will start to collapse. If they hold together, then no action is taken by the RCM 50. However, if a power rail starts to collapse from the overload, at least one power supply will report itself as failed. When this event occurs, the RCM 50 will power-disable slots containing modules 10 as described above, to alleviate the power overload.

If power overdraw is sufficiently severe such that the RCM 50 is unable to react in time to prevent the power rails from collapsing, the hub will shut-down, and recovery will be preformed by the Power Management Initialization function (described above) when the RCM 50 reboots.

In a hub managed by a DMM 30, if there is sufficient power budget available for the newly inserted module 12, then the RCM 50 will update its power budget with the revised unmanaged power allocation values provided by the DMM 30. No further action is taken or required by the RCM 50. In an unmanaged or in an environment managed by a prior art network management module (nMM) (i.e., module 8), the RCM 50 will take no further action.

Power manageable modules are modules 10 developed for power management. Slots containing such modules 10 are power-enabled at the discretion of the RCM 50 based on the module power requirements, slot power class, and current power budget. Notification of module insertion and power status will be reported to the DMM 30. Power requirements for the inserted module 10 will be obtained from the module's inventory information memory 20. When a slot containing a module 10 is power-enabled by the RCM 50, the available power budget is reduced to reflect the power usage of the inserted a managed module.

When a module 10 is removed, the RCM 50 will power-disable the slot and return the power allocated to that module 10 to the power budget. Slots containing modules 10 that are power-pending will be power-enabled, if possible. If a module 12 is removed from a hub managed by a DMM 30, the RCM 50 will power-disable the slot and update its power budget based on the revised unmanaged power allocation values supplied by the DMM 30. If a module 12 is removed from a hub that is either unmanaged or managed by a prior art network management module (i.e., module 8) nMM., then the RCM 50 will power-disable the slot and take no further action.

The DMM 30 can request services of the RCM 50 that implements power management. The RCM 50 provides interfaces to allow management to change power management configuration data. The following describes the interfaces used to modify power management configuration data and how the data is used.

DMM 30 services to modify power management configuration data are provided via Terminal Command and SNMP. Once data has been modified, the DMM 30 sends this information to the RCM 50 for establishing a parameters table (Ptable). The RCM 50 will attempt to implement the new power management configuration data and then store the accepted configuration in the hub inventory EEPROM 60.

The DMM 30 is able to disable power to a specific slot containing module 10 by entering a command (e.g.: a managed>set power slot<1–17>mode disable). The RCM 50 responds by disabling power to the specified slot and returning the power allocated for the module 10 in that slot to the available power budget. Once the DMM 30 disables power to a slot, the RCM 50 will not enable power to that slot unless explicitly requested by the DMM 30. Power cannot be disabled to an empty slot, a slot containing a module 12, or the slot containing the master DMM 30.

The DMM 30 is able to enable power to a specific slot containing a module 10, provided there is sufficient available power to do so. This is performed by entering a command (e.g. a managed>set power slot<1–17>mode enable). If there is sufficient available power, the RCM 50 responds by enabling power to the specified slot and reducing its power budget by the power requirements of the Module 10 in the slot. If there is insufficient power to meet the power requirements of the Module 10 in the slot, the slot will remain in the power-pending state until sufficient power becomes available. Note that power cannot be enabled to an empty slot.

The DMM 30 is able to assign a power class to a specified slot that contains a Module 10 by entering a command (e.g. a managed>set power slot<1–17>class<1–10>). Assigning a new power class to a slot containing a module 10 supersedes the slot's previous power class.

The DMM 30 is able to enable or disable power fault-tolerant mode by entering a command (e.g. a managed>set power mode<fault_tolerant/not_fault_tolerant>). The RCM 50 responds to the enabling or disabling of power fault-tolerant mode as described above.

The DMM 30 is able to enable or disable overheat automatic power-down mode by entering a command (e.g. a managed>set power overheat_auto_power_down_mode<enable/disable>). The effect of enabling or disabling overheat automatic power-down mode is described above.

The DMM 30 is able to display power on a hub-wide basis or on a slot basis by entering commands (e.g. a managed>show power budget—for displaying power budget information on a per voltage line basis; a managed>show power mode—for displaying current power fault-tolerant mode and overheat automatic power-down mode; a managed>show power slot<1–17>—for displaying the specified slot's power class, power state and power status; a managed>show power slot all—for displaying power class, power state and power status for all slots; a managed>show power all—for displaying all information displayed by the previous commands.

While a specific embodiment of the invention has been shown and described in detail to illustrate the application of the principles of the invention, it will be understood that the invention may be embodied otherwise without departing from such principles.

What is claimed is:

1. A power management system for local area network hubs, comprising:
    a network switching hub including a power rail and a connection backplane with a plurality of connection slots;
    a power supply connected to said power rail of said switching hub, said power supply having one or more elements providing a maximum power available for the system;
    manageable modules connected to said switching hub, each manageable module of said manageable modules having memory means connected to said manageable module providing information as to the power requirements of said manageable module;
    power connection means for connecting and disconnecting each of said manageable modules to said power rail;
    a controller module connected to said manageable modules via said switching hub, said controller module including memory means for receiving data from said manageable modules as to power requirements and microprocessor means for calculating power requirements of the system and acting on said power connection means for controlling the supply of power to each manageable module based on power requirements of said system.

2. A power management system according to claim 1, wherein said power connection mean comprises a power control circuit included in each of said manageable modules, said controller module being connected to said power control circuit of each of said manageable modules for controlling a connection of said manageable modules to said power rail.

3. A power management system according to claim 1, wherein said controller module includes module presence sensing means, connected to each of said connection slots for determining whether one of said manageable module is connected to each of said connection slots.

4. A power management system according to claim 1, wherein said microprocessor determines available power after determining said power requirements of said system and reserves the power delivery of power equal to said power requirements of said system to reserve an amount of necessary power in case of primary power failure.

5. A system according to claim 1, further comprising distributed management module means, connected to said switching hub backplane for collecting data from said controller module for displaying said data, said distributed management module for establishing a priority scheme for manageable modules connected to said backplane including assigning a power class to each manageable module connected to said backplane, each of said management modules connected to said backplane being connected via a slot, said controller module processor power enabling and power disabling slots with modules connected thereto in dependance upon the power class of the various modules connected thereto.

6. A system according to claim 5, further comprising unmanaged modules connected to slots of said backplane, said unmanaged modules being assigned a highest power class value whereby modules with lower power class values are power disabled before those with higher power class values.

7. A system according to claim 6, wherein said distributed management module means accesses power required by unmanaged modules and transmits power value data to the controller module for the unmanaged modules, said controller module receiving said power value for updating said power budget.

8. A system according to claim 1, wherein said controller module is connected to temperature sensors located at positions in said switching hub, each of said management modules connected to said backplane being connected via a slot, said controller module microprocessor power disabling slots upon receiving temperature sensor data over a set threshold.

9. A system according to claim 1, wherein said controller module includes power type/capacity input means for receiving data from said power supply and for determining the type of power available and for determining the power capacity of the power supply.

10. A method of power management for local area network hubs, comprising the steps of:
    providing a network switching hub including a connection backplane with a plurality of connection slots and at least once power rail;
    providing at least one power supply having one or more elements providing a maximum power available for the system, said power supply being connected to said power rail;
    connecting manageable modules to said switching hub via said connection slots, each manageable module of said manageable modules having a memory providing information as to the power requirements of said manageable module; and
    receiving data from said manageable modules as to power requirements and calculating power requirements of the system and receiving data as to the maximum power available for automatically controlling a connection of each manageable module to the power rail and supplying power to each manageable module if the power requirements of the system do not exceed the maximum power available for the system.

11. A method according to claim 10, further comprising controlling a supply of power to each of said manageable modules.

12. A method according to claim 10, further comprising determining whether a module is connected to each of said connection slots.

13. A method according to claim 10, further comprising determining available power after determining said power requirements of the system and reserving the power delivery of power equal to said power requirements of the system to reserve an amount of necessary power in case of primary power failure.

14. A method according to claim 10, further comprising collecting data and displaying said data and establishing a priority scheme for manageable modules connected to said backplane including assigning a power class to each manageable module connected to a slot, and power enabling and power disabling slots with modules connected thereto, in dependance upon the power class of the various modules connected thereto.

15. A method according to claim 14, further comprising providing unmanaged modules connected to slots of said backplane, said unmanaged modules being assigned a highest power class value whereby modules with lower power class values are power disabled before those with higher power class values.

16. A method according to claim 15, further comprising accessing power required by unmanaged modules and transmitting power value data to the controller module for the unmanaged modules, said controller module receiving said power value for updating said power budget.

17. A method according to claim 10, further comprising sensing temperature at positions in said switching hub and disabling slots upon sensing temperature over a set threshold.

18. A method according to claim 10, further comprising receiving data from said power supply and determining a type of power available and for determining the power capacity of said power supply.

19. A power management system for local area network hubs, comprising:

a network switching hub including and a connection backplane and a plurality of connection slots;

a power supply having one or more elements providing a maximum power available for the system;

manageable modules connected to said switching hub, each of said manageable modules having memory means connected to the module providing information as to the power requirements of the module;

a power control circuit included in each of said manageable modules, said controller module being connected to said power control circuit of each of said manageable modules for controlling a connection of said manageable modules to said power supply a controller module connected to said manageable modules via said switching hub, said controller module including memory means for receiving data from said manageable modules as to power requirements and receiving data as to said maximum power available for the system, module presence sensing means connected to each of said connection slots for determining whether a module is connected to each of said connection slots and microprocessor means for calculating power requirements of the system and acting on said power connection means for controlling the connection of each module to the power supply to supply power to each module of said modules which is connected via a slot to said backplane provided the calculated power requirements of the system do not exceed the maximum power available for the system.

20. A method of power management for local area network hubs, comprising the steps of:

providing a network switching hub including a connection backplane with a plurality of connection slots and at least one power rail;

providing at least one power supply having one or more elements providing a maximum power available for the system, said power supply being connected to said power rail;

connecting a first manageable module to said switching hub, said manageable module having a memory providing information as to the power requirements of the module;

providing a controller with a memory and a microprocessor;

receiving data at said controller from said manageable module as to power requirements and calculating power requirements of the system based on the connected manageable module and receiving data as to the maximum power;

using the microprocessor to determine if the power requirements of the system exceed the maximum power available for the system;

supplying power to said manageable module if the power requirements of the system do not exceed the maximum power available for the system by controlling a connection of said manageable module to said power rail.

21. A method according to claim 20, further comprising providing several power rails, each having a different type of power;

receiving data from said power supply and determining a type of power available; and switching said module to a power rail with a power type for the particular module.

* * * * *